3,352,945
FORMALDEHYDE-PROPYLENE GRAFT CO-
POLYMERS AND PROCESS FOR THEIR
SYNTHESIS
Attilio Palvarini, Milan, Edgardo Horak, Seveso, Milan, and Franco Milizia, Cesano Maderno, Milan, Italy, assignors to Snia Viscosa Società Nazionale Industria Applicazioni Viscosa S.p.A., Milan, Italy, a company of the Italian Republic
No Drawing. Filed Oct. 26, 1964, Ser. No. 406,540
Claims priority, application Italy, Nov. 7, 1963, 22,711/63, Patent 708,144
4 Claims. (Cl. 260—897)

ABSTRACT OF THE DISCLOSURE

An amorphous polypropylene product, such as atactic amorphous polypropylene, an oil tetramer of polypropylene, or an amorphous ethylene-polypropylene copolymer is completely dissolved in an organic solvent, such as n-hexane or n-heptane. Then an anhydrous gaseous formaldehyde is supplied to the solution to the saturation point. Then a catalyst, such as tributyl amine, is injected. This immediately initiates polymerization, which is carried on until the formaldehyde is completely absorbed. The grafted copolymer obtained is preponderantly formaldehyde but may contain up to 10% of copolymerized propylene.

The present invention relates to a novel polymeric composition constituted by propylene and formaldehyde, and obtained by grafting of polyformalic chains on a preformed propylene polymer.

As a propylene polymer, preferably a polymer soluble in aliphatic and aromatic hydrocarbons is employed. These are usually employed as reaction media in the polymerization of anhydrous formaldehyde, according to processess already known in the art. For this purpose are suited the polypropylenes having a degree of polymerization four or more monomer units.

Some examples of those products having lower molecular weight are the tetrameric oligomers of propylene employed for the synthesis of alkyl-aryl-sulfonated detergents, while some examples of products having a more elevated molecular weight are the atactic amorphous polypropylenes obtained as by-products, together with isotactic crystalline polypropylenes, in the polymerization of propylene with stereospecific catalysts.

Those polymers are characterized by values of intrinsic viscosity (measured in decalin at 135° C.) of from 0.5 to 1.5 depending upon the catalysts and techniques employed.

Not only amorphous polypropylenes, but also amorphous ethylene-propylene copolymers soluble in hydrocarbon type solvents may be employed.

The use of atactic amorphous polypropylene has proved to be particularly interesting, thanks both to its low cost and to the circumstance that this process permits utilizing a product that had not found any convenient application heretofore, by transforming it into a product having valuable characteristics.

The copolymers according to the present invention are prepared by polymerizing anhydrous gaseous formaldehyde in a reaction medium formed by a solution of propylenic polymer having 4 or more monomer units in an aliphatic or aromatic solvent and using conventional usual basic catalysts of formaldehyde such as tributyl amine, metal oxides etc. A part of the dissolved propylenic polymer is activated and reacts with the formaldehyde thereby producing a solid copolymer in granular shape and insoluble in the reaction medium. At the end of the reaction the polypropylene that has not reacted is separated by filtration.

The polymer obtained is prevailingly formaldehyde and may contain up to 10% of copolymerized propylene. We hold that such copolymer is of the grafted kind.

A further advantage of the process described comes from the fact that the speed of polymerization of the formaldehyde in the presence of the dissolved polypropylene appears to be much higher than if operating in the absence of polypropylene. Practically we have always observed a total absorption of the formaldehyde sent into the reactor, also with comparatively elevated flows (see examples appended), whilst if operating in the absence of polypropylene and under otherwise equal conditions, part of the formaldehyde does not react and leaves the reactor.

Moreover the copolymer obtained appears to be endowed with a thermal stability higher than that of a polyformaldehyde obtained under analogous conditions but in the absence of polypropylene, as appears from the examples that follow. The acetylated and stabilized copolymers display values of the constant K 222° lower than 0.1 (this means that the percent weight loss per minute for thermal degradation of the copolymer at 222° C. is less than 0.1), which correspond to very high thermal stabilities.

They can be moulded or extruded by usual methods, thereby obtaining manufactured articles which in addition to the favourable thermal and mechanical characteristics typical for polyacetalic resins, display improved characteristics of impact strength (shock-resistance).

EXAMPLE I

An atactic amorphous polypropylene was used having ($\eta$) 0.5 and a softening temperature of 65° C., previously dried under high vacuum at 60° C. for 4 hours. 30 grammes of that polypropylene were dissolved in 300 ml. of anhydrous n-hexane, in a 500 ml. flask equipped with a stirrer. The dissolving is completed by heating and refluxing for half an hour. Then the solution is brought up to 40° C. and anhydrous gaseous formaldehyde is supplied at a flow-rate of about 18 to 20 litres/hour. After saturation, 0.10 gramme of tributyl amine are injected. The introduction of the catalyst causes an immediate beginning of polymerization, which is carried on for 3 hours at a temperature of 40 to 45° C.

The absorption of the formaldehyde is total.

The polymer having granular shape is filtered, washed with hot n-hexane, extracted in Kumagawa with n-hexane for 24 hours, finally washed with acetone and dried in vacuum at 60° C.

There are obtained 72 grammes of polymer containing 9% of bonded polypropylene. The melting point is 174° C. and K 222° is 1.0, whilst K 222° of a polyformaldehyde obtained under analogous conditions, but in the absence of polypropylene, is 2.2.

The acetylated product to which the following stabilizers have been added:

1% of 4,4'-butylidene, bis(3 methyl-6-t-butyl phenol) and

1% of polyamidic mixture has a K 222° lower than 0.1

EXAMPLE II 15 grammes of polypropylene as in Example 1 are dissolved in 300 ml. of anhydrous n-hexane, in a flask of 500 ml. volume-capacity. Then the temperatures is brought up to about 40° C. and anhydrous formaldehyde is supplied at a flow-rate of about 11 litres/hour; after saturation, 0.10 gramme of tributyl amine are injected.

The polymerization begins immediately and the absorption of the formaldehyde is total.

After 3 hours' reaction, the polymer is recovered in granular shape and is separated from the polypropylene that has not reacted, as indicated in Example I.

There are obtained 46 grammes of polymer containing 6% of bonded polypropylene. The melting point is 175° C.

EXAMPLE III

In a 500 ml. flask there are dissolved 6 grammes of gummy amorphous polypropylene as per Example I, in 300 ml. of anhydrous n-hexane. Then a stream of anhydrous formaldehyde is supplied with a flow-rate of about 10 litres/hour, followed by the injection of 0.1 gramme of tributyl amine. The polymerization is conducted at 30-35° C. for the duration of 3 hours, the absorption of formaldehyde being total.

The copolymer obtained is isolated and purified from the unreacted polypropylene by means of extraction in Kumagawa as indicated in Example I. There are obtained 37 grammes of granular polymer containing 4% of bonded polypropylene and having a melting point of 174° C. The polymer has a Melt Index of 0.53 g./10 minutes at 200° C., a spinneret of 0.25 millimeter diameter being used.

EXAMPLE IV

Into a 500-ml. flask are put 32 grammes of oil tetramer of propylene of the trade, distilled, and 200 ml. of n-heptane. Then a stream of anhydrous formaldehyde is made to pass at a flow-rate of about 12 litres/hour and 0.05 gramme of tributyl amine are injected.

The polymerization begins immediately and is carried on for 3 hours at room temperature, while a total absorption of the formaldehyde supplied takes place.

The polymer in granular shape is separated from the liquid phase by filtration and is then repeatedly washed with hot n-heptane so as to extract the tetramer fraction of the unreacted propylene.

There are obtained 50 grammes of copolymer containing 8% of propylene and having a melting point of 170° C.

We claim:
1. A process for producing graft copolymers of formaldehyde and olefins having a melting point of between about 170°-175° C. containing at least 90% formaldehyde, comprising:
 (a) dissolving an amorphous polypropylene starting material having 4 or more monomer units selected from the group consisting of atactic amorphous polypropylene, amorphous ethylene-propylene copolymer, both having an intrinsic viscosity, measured in Decalin at 135° C., of 0.5 to 1.5, and of oil tetramer propylene, in an organic solvent selected from the group consisting of n-hexane and n-heptane,
 (b) introducing into said solution a formaldehyde monomer,
 (c) introducing a catalyst for formaldehyde polymerization into said solution to cause copolymerization of said monomer formaldehyde and said dissolved polypropylene starting material to form a precipitant; and
 (d) separating the precipitant from the solution.

2. The process of claim 1, wherein the formaldehyde monomer is a gaseous anhydrous formaldehyde monomer.

3. The process of claim 1, wherein the catalyst is tributyl amine.

4. The product of the process of claim 1.

References Cited

UNITED STATES PATENTS

| | | | |
|---|---|---|---|
| 3,219,725 | 11/1965 | Kirkland et al. | 260—73 |
| 3,225,121 | 12/1965 | Baker | 260—73 |
| 3,252,940 | 5/1966 | Mantell | 260—67 |

FOREIGN PATENTS

| | | |
|---|---|---|
| 245,696 | 7/1963 | Australia. |

MURRY TILLMAN, *Primary Examiner.*

GEORGE F. LESMES, *Examiner.*

J. T. GOOLKASIAN, T. G. FIELD, *Assistant Examiners.*